United States Patent

[11] 3,627,717

| | | |
|---|---|---|
| [72] | Inventor | Ludwig Kuhnen<br>Marl, Germany |
| [21] | Appl. No. | 790,152 |
| [22] | Filed | Jan. 9, 1969 |
| [45] | Patented | Dec. 14, 1971 |
| [73] | Assignee | Chemische Werke Huls Aktiengesellschaft<br>Marl, Germany |
| [32] | Priorities | Jan. 20, 1968 |
| [33] | | Germany |
| [31] | | P 17 20 430.7;<br>Apr. 18, 1968, Germany, No. P 17 70 223.7 |

[54] VINYL CHLORIDE EMULSION POLYMERIZATION, COPOLYMERIZATION, AND PRODUCT THEREFROM
8 Claims, No Drawings

[52] U.S. Cl. .................................................. 260/23 EM,
260/23 X, 260/23 R, 260/29.6 PT, 260/29.6 Z,
260/29.7 R, 260/29.7 SR, 260/29.7 PT, 260/45.7
R, 260/45.7 SU, 260/45.75 K, 260/45.75 R,
260/45.85, 260/45.95, 260/45.9 R

[51] Int. Cl. .................................................... C08f 3/30,
C08f 29/18, C08f 45/54

[50] Field of Search ........................................ 260/29.7,
29.70, 29.6 Z, 29.6 PT, 23, 23 EM, 29.7 R, 29.7
SR, 29.7 PT, 45.7, 45.75, 45.85, 45.9, 45.95

[56]         References Cited
         UNITED STATES PATENTS

| | | | |
|---|---|---|---|
| 2,140,048 | 12/1938 | Fikentscher et al. ......... | 260/2 |
| 3,057,831 | 10/1962 | Holdsworth ................... | 260/78.5 |
| 3,208,965 | 9/1965 | Kuehne ........................ | 260/30.6 |

OTHER REFERENCES

Emulgator K30, Bulletin of Farbenfabriken Bayer, Leverkusen (Germany) 2 pages, 1964.

Methoden der Organischen Chemic (Houben–Weyl), Thieme Verlag Stuttgart (1961) page 871.

Chemie Lexikon, Edited by Roemmp, Franck–L' sche Verlags. Stuttgart (1966), page 3968.

Gummi und Asbest, Vol. 2, (1949) page 263

Polyvinyl Chloride und Vinylchloride Misch polymerisate (Edited by Kainer) Springer–Verlag, Berlin (1951) page 43

Sosnofsky– Free Radical Reactions in Prep. Org. Chem. (1964) page 104. Macmillan (N.Y.)

Stirton Jour. Amer. Oil Chem. Soc. Vol. 39, pages 490– 496 (1962)

Stirton et al. Ibid. Vol. 29, pages 198– 201 (1952)

Stabilizatoren Handbuch der Deutschen Advance Produktion (1966) page 31

*Primary Examiner*—Donald E. Czaja
*Assistant Examiner*—H. S. Cockeram
*Attorney*—Krafft & Wells ABSTRACT: Vinyl chloride polymer and copolymer compositions are prepared by emulsion polymerization of vinyl chloride in the presence of sodium salts of α-sulfo-fatty acids. The compositions and methods are improved by emulsifying the vinyl chloride in the presence of sodium salts of a α-sulfo-fatty acids having 12 to 24, and preferably 12 to 18 carbon atoms, wherein the sodium salts of the α-sulfo-fatty acid have a concentration of 0.6 to 4.0, and preferably 0.8 to 3.0 percent by weight based on the monomers and the polymerization is performed at a pH value of 6 to 11, and preferably 7.0 to 10.0. Alkali salts are added, the emulsion spray-dried, and the recovered solid polymer product is found to possess improved heat stability when stabilized with barium, cadmium, or lead stabilizers.

VINYL CHLORIDE EMULSION POLYMERIZATION, COPOLYMERIZATION, AND PRODUCT THEREFROM

BACKGROUND OF THE INVENTION

The field of the invention is synthetic resin interpolymers of polymerized unsaturated compounds and polymerized unsaturated compounds from halogenated hydrocarbons comprising acyclic vinyl halides.

The state of the prior art may be ascertained by reference to the "Encyclopedia of Polymer Science and Technology," Vol. 5, under the section "Emulsion Polymerization," pages 801–859, and by reference to the Kirk-Othmer, "Encyclopedia of Chemical Technology," Vol. 14, (1955), under the section "Vinyl Chloride," pages 723–735, and particularly pages 727–730. Other prior art references include the 1966 Stabilizer Handbook of German Advance Production GmbH and German Pat. No. 654,989 and No. 842,119.

It is known that polyvinyl chloride and vinyl chloride-copolymers can be produced in aqueous dispersions by the method of suspension polymerization or emulsion polymerization. The suspension polymers have, as compared with the emulsion polymers, certain advantages which, among others, relate to their improved heat stability and transparency. The emulsion polymerization, on the contrary, has the advantage of permitting the polymerization to be performed optionally either discontinuously or continuously. The emulsion polymers can also be more easily worked with and formed into pastes.

Additionally, it has been found that vinyl chloride copolymers in general exhibit a lesser thermostability than the homopolymer.

For the stabilization of polyvinyl chloride made by emulsion polymerization, the following stabilizer classes are most frequently used:
1. Tin-organic stabilizers;
2. Barium-cadmium stabilizers; and
3. Lead stabilizers.

The choice of stabilizer must, however, depend very largely on the polyvinyl chloride emulsifier that is present.

A polyvinyl chloride or copolymer which is polymerized in the presence of a sulfate group- or sulfonate group-containing emulsifier (as for example in the presence of an alkyl sulfate or secondary alkyl sulfonate), is advantageously stabilized by expensive tin-organic stabilizers. The same polymer would, on the contrary, be more poorly stabilized by the less expensive barium-cadmium or lead stabilizers. Also, an alkaline prestabilization of the dispersion in a known manner by the addition of such amounts of inorganic alkalies that the pH value of the dispersion prior to an atomization drying lies in the alkaline region, effects a further improvement of the thermal stability only in the stabilization of the above-mentioned polyvinyl chloride or copolymers with tin-organic stabilizers, while the same stabilization treatment with barium-cadmium or lead compounds has little or no effect.

A polyvinyl chloride or copolymer, on the contrary, which is polymerized in the presence of a carboxyl group-containing emulsifier, as for example sodium laurate or sodium stearate, can be stabilized very well with lead compounds. A similar treatment with tin-organic or barium-cadmium stabilizers results, however, in products which, when heated, will quickly discolor and decompose. Such early occurrence of discoloration and decomposition can in no case be prevented by an additional alkaline prestabilization of the dispersion in a known manner with an addition of inorganic alkalies to the polyvinyl chloride dispersion prior to an atomization drying process.

It can also be learned from the Stabilizer Handbook of 1966 of the German Advance Production GmbH, that alkaline prestabilized polyvinyl chloride will not lend itself to barium-cadmium stabilization.

On the basis of this determination, it can be stated that there has heretofore not been any polyvinyl chloride that can be effectively stabilized with all most-frequently used classes of stabilizers.

It is already known that sulfonates of short-chained fatty acids can be added as adjuvants for the polymerization of vinyl chloride (German Pat. No. 842,119). However, by this method suspensions (of particle size 1 $\mu$) are obtained which can be processed by filtration or centrifuging so that the emulsifier will not remain in the polymer.

German Pat. No. 654,989 also teaches that sodium sulfopalmitate can be added as an adjuvant for the polymerization of acrylic acid derivatives, possibly in mixtures with vinyl chloride. By the method described in this patent, the resulting emulsions are, however, coagulated, and after washing with water there are obtained polymers which although of a high degree of purity, have only little thermal stability.

SUMMARY OF THE INVENTION

An object of this invention is a process for the production of polymers and copolymers of vinyl chloride having improved heat stability and stabilizability with thermostabilizers, said polymers and copolymers being produced by emulsion-polymerization of vinyl chloride and by copolymerization of the vinyl chloride with polymerizable unsaturated compounds in the presence of sodium salts of $\alpha$-sulfo-fatty acids.

Since thermostability is very important, it is another object of the present invention to improve the thermostability of emulsion polymers by suitable methods.

Of special significance is an improved heat stabilizability by the use of atomization drying as a processing method, since the residual presence of the emulsifying agent and other additives in the polymer will necessarily have an unfavorable effect on its thermal stability.

By the term atomization drying, applicants have in mind the principle of atomizing the aqueous dispersions to form a spray of droplets which mix with hot air to evaporate the water and produce the dry vinyl chloride polymers and copolymers. (Kirk-Othmer, "Encyclopedia of Chemical Technology," 2. Edition, Vol. 7, (1965), under the section "Drying," pages 360–368).

DESCRIPTION OF THE PREFERRED EMBODIMENTS

According to the present invention, it has been found that, unexpectedly, polymers of vinyl chloride with improved heat-stabilizability are produced by emulsion-polymerization of vinyl chloride in the presence of sodium salts of $\alpha$-sulfo-fatty acids with 12 to 24, preferably 12 to 18 carbon atoms in amounts of 0.6 to 4.0 percent, preferably 0.8 to 3.0 percent by weight, based on the weight of the monomer, and by performing the polymerization under a pH value between 6 and 11, and preferably between 7.0 and 10.0.

In a preferred form of this process, the polyvinyl chloride dispersions prior to their atomization drying, are reacted with 0.02 to 2.0 percent, preferably 0.1 to 0.8 percent by weight of alkaline substances, especially alkali carbonates, based on the polymers. The result is a surprisingly strong synergistic action of the emulsifier, the alkali and the stabilizer on the thermostability. Especially advantageous is the addition of alkaline lithium compounds, especially lithium carbonate and lithium hydroxide, to the polyvinyl chloride dispersions before their drying by atomization.

It has also been found that copolymers of vinyl chloride with generally improved heat stabilizability can be produced by emulsion copolymerization of vinyl chloride with polymerizable monomers where sodium salts of $\alpha$-sulfo-fatty acids with 12 to 24, especially 12 to 18 carbon atoms are added in amounts of 0.6 to 4.0 percent, preferably 0.8 to 3.0 percent by weight, based on the monomers, and the polymerization performed with a pH value between 6.0 and 11.0, preferably between 7 and 10, and the dispersions treated with 0.02 to 2.0 percent, preferably 0.1 to 0.8 percent by weight of alkaline substances, preferably alkali carbonates.

It is also especially advantageous to add alkaline lithium compounds, especially lithium carbonate and lithium hydroxide to the copolymer dispersion prior to its drying by atomization.

It is advisable to let the alkaline prestabilized emulsions remain standing for some time, for example, a few hours or over night, before the drying by atomization.

The polymers and copolymers of the present invention are effectively stabilized with tin-organic, barium-cadmium and lead stabilizers, so that with the same amounts of stabilizer which have heretofore been used with fatty acid, alkyl sulfate- or alkyl sulfonate-polymers, there is much less initial discoloration and generally much better thermostability, or with relatively smaller amounts of stabilizer, the same thermostability is obtained.

It is also possible to stabilize with other stabilizing agents, as for example, diphenyl-thiourea and calcium-zinc compounds, possibly in the presence of costabilizers such as epoxy-softeners, chelating agents and UV absorbers. Plasticizers can also be added.

Specific examples of suitable stabilizers are: the silicate, basic sulfate, basic carbonate, and basic phosphate of lead; salts of lead, tin, barium, calcium, cadmium, strontium, sodium, and lithium of such acids as formic, oxalic, maleic, caprylic, undecylenic, lauric, stearic, and ricinoleic acid; metallic salts of aromatic acids, such as basic lead phthalate; barium salts of esters of thiophosphoric acid; dibasic lead phosphite; salts of aliphatic thioacids, epoxystearic acids, epoxysuccinic acids; epoxidized peanut oil and soya oil; compounds of quadrivalent tin $R_nS_nX_{4-n}$ where $R$ is an organic radical bonded to the tin atom through the carbon atoms and $X$ is an organic radical bonded to the tin atom through an oxygen or sulfur atom or an acid group, such as alkoxy, mercapto and acid derivatives of dibutyltin and dioctyltin, dibutyltin dilaurate, dioctyltin dilaurate, dibutyltin maleate, tetramethyl-, tetrabutyl-, tetraoctyl-mercaptides of tin, mercaptide based on dioctyltin and the ester of thioglycolic acid; esters of $\beta$-aminocrotonic and p-aminobenzoic acids; substituted hydroxybenzophenones, phenolates, monosalicylates of hydroquinone, resorcinol and catechol; phenyl-$\beta$-naphthylamine, compounds of calcium with the ethyl ester of acetoacetic acid; mercaptosilanes, such as n-butyl-tris-(thiobenzoate)-silane. Very often, mixtures of two or three individual components are used and permit an intensification of the effectiveness of the stabilizing action.

Another advantage is the splendid transparency of the polymers produced by this invention.

The sodium salts of $\alpha$-sulfo-fatty acids which are used as emulsifiers in this invention are derived from acids having 12 to 24 carbon atoms, as for example, $\alpha$-sulfolauric acid, $\alpha$-sulfomyristic acid, $\alpha$-sulfopalmitic acid, $\alpha$-sulfostearic acid, $\alpha$-sulfo-$\alpha$-methyl-palmitic acid, $\alpha$-sulfo-$\alpha$-methylstearic acid, $\alpha$-sulfolignoceric acid, $\alpha$-sulfoarachidic acid, $\alpha$-sulfobehenic acid, and mixtures thereof.

Specific examples of the suitable alkali salts of $\alpha$-sulfo-fatty acids are: the disodium salt of $\alpha$-sulfolauric acid, disodium salt of $\alpha$-sulfomyristic acid, disodium salt of $\alpha$-sulfopalmitic acid, disodium salt of $\alpha$-sulfostearic acid, disodium salt of $\alpha$-sulfo-fatty acid with 12 to 18 carbon atoms (approximate chain distribution 52% $C_{12}$, 18% $C_{14}$, 10% $C_{16}$, 20% $C_{18}$), the disodium salt of $\alpha$-sulfo-fatty acid with 16 to 18 carbon atoms (approximate chain distribution 48% $C_{16}$, 52% $C_{18}$).

The usual radical initiators are used, such as $K_2S_2O_8$, $(NH_4)_2SO_8$, $H_2O_2$ and $K_2S_2O_8/Na_2S_2O_5$.

The polymerization temperatures are kept within the temperature range used in the emulsion polymerization of vinyl chloride.

The polymerization can, if desired, be performed in a single step, or if a higher solids content is desired, then it is performed advantageously in two stages or continuously.

As alkaline substances with which the polyvinyl chloride dispersions are treated before their processing, use can be made, for example, of alkali hydroxides such as KOH, NaOH and LiOh, and also of alkali salts of weak acids, for example, alkali carbonates such as $Li_2CO_3$, $Na_2CO_3$ and $K_2CO_3$. In most cases the alkaline substances are added to the polymer or copolymer dispersions in an aqueous solution, such as a 2 percent soda-solution. Alkaline substances which are only sparingly soluble in water are applied in aqueous suspension, such as a suspension of 3 g. $Li_2CO_3$ in 100 g. water.

The processing is carried out by spray drying or by any other suitable method by which the emulsifier and the additives remain in the polymer.

Vinyl monomers suitable for producing vinylchloride copolymers include vinyl esters such as vinyl acetate and vinyl propionate, vinyl ethers such as vinyl isobutyl ether and vinyl lauryl ether, acrylic acid and acrylic esters such as methyl- butyl- and octyl-acrylate, methacrylic acid esters such as methyl-, butyl-, octyl-methacrylate, methacryl-nitrile, acryl-nitrile, vinyl bromide, vinylidene chloride, fumaric acid- and maleic acid-esters, such as methyl fumarate, methyl maleate, ethyl maleate, butyl maleate and octyl maleate, ethylene, propylene and isobutylene.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1 a

In a 12 liter autoclave with stirrer and heating jacket, 3,800 g. water, 1.7 g. NaOH, 12.1 g. stearic acid, 13 g. sodium alkyl sulfonate (K30) * and 1.3 g. $K_2S_2O_8$ are reacted. After rinsing with nitrogen, 1,300 g. vinyl chloride are injected into the evacuated autoclave. The contents of the autoclave are heated to 50° C. with stirring and are kept at this temperature during the entire polymerization time. In the course of 14.5 hours, the pressure drops to 1 atmosphere and the autoclave is cooled. The resulting polyvinyl chloride dispersion has a pH value of 7.1 and a solids content of 25.5 percent.

* K30 is the trademark for a mixture of paraffin-sulfonates of sodium with an average chain length of 14–15 carbon atoms (Houben-Weyl, Makromolekulare Stoffe I, 1961, page 196).

EXAMPLE 1 b

In a 40 liter autoclave with stirrer and heating jacket, 12,250 g. water with 15.3 g. NaOH, 109 g. stearic acid, 117 g. sodium alkyl sulfonate (K30), 11.7 g. $K_2S_2O_8$ and the polyvinyl chloride dispersion of example 1a are reacted. After rinsing with nitrogen, 11,700 g. vinyl chloride are injected into the evacuated autoclave. The contents of the autoclave are heated to 50° C. with agitation and are kept at this temperature during the entire polymerization process. In the course of 13 hours the pressure drops to 1 atmosphere and the autoclave is cooled. The resulting polyvinyl chloride dispersion has a pH value of 7.4 and a solids content of 43.8 percent.

The polyvinyl chloride dispersion is divided into four portions. Each of three of these is mixed respectively with an aqueous solution of:

(1b. 1) 0.15 percent soda, based on the solids content;
(1b. 2) 0.25 percent soda; and
(1b. 3) 0.35 percent soda.

The fourth portion remains without any additive. All four portions are processed by atomization. The K value of the isolated polyvinyl chloride is 70.5 (measured as 0.5 percent solution in cyclohexanone at 25° C.). By K value is meant:

$$\frac{\log \eta_{red}}{c} = \frac{0.75k^2}{1+1.5\cdot k\cdot c}+k$$

$$K\text{-value}=1000\cdot k$$

(Houben-Weyl, Makromolekulare Stoffe I, G. Thieme Verlag, Stuttgart, 1961, page 83.)

EXAMPLE 2 a

In a 12 liter autoclave equipped with a stirrer and a heating jacket, 3,900 g. water are reacted with 28.6 g. sodium alkyl sulfonate (K30), 1.3 g. $K_2S_2O_8$, 1.3 g. $NaH_2PO_4\cdot 2H_2O$ and 1.3 g. $Na_2HPO_4\cdot 12H_2O$. After rinsing the mixture with nitrogen, 1,300 g. vinyl chloride are injected into the evacuated autoclave. The contents of the autoclave are then heated to 50° C. with stirring, and during the entire polymerization are kept at this temperature. In the course of 18 hours the pressure falls to 1 atmosphere and the autoclave is cooled. The resulting polyvinyl chloride dispersion has a pH value of 3.6 and a solids content of 25 percent.

EXAMPLE 2 b

In a 40 liter autoclave equipped with a stirrer and a heating jacket, 12,700 g. water are reacted with 360 g. sodium alkyl sulfonate (K30), 11.7 g. $K_2S_2O_8$, 11.7 g. $NaH_2PO_4 \cdot 2H_2O$, 11.7 g. $Na_2HPO_4 \cdot 12H_2O$ and the polyvinyl chloride dispersion of example 2a. After rinsing the mixture with nitrogen, 11,700 g. vinyl chloride are injected into the evacuated autoclave. The contents of the autoclave are then heated to 50° C. with stirring and during the entire polymerization are kept at this temperature. In the course of 15 hours the pressure falls to 1 atmosphere and the autoclave is cooled. The resulting polyvinyl chloride dispersion has a pH value of 6.0 and a solids content of 44.2 percent.

The polyvinyl chloride dispersion is divided into two equal portions. One of the portions remains without any addition (2b.1). The other portion is mixed with an aqueous solution of 0.3 percent soda, based on the solids content (2b.2). Both of these polyvinyl chloride dispersions are then dried by atomization. The K-value of the isolated polyvinyl chloride is 71 (measured as a 0.5 percent solution in cyclohexanone at 25° C).

EXAMPLE 3 a

In a 12 liter autoclave equipped with a stirrer and a heating jacket, 3,850 g. water are reacted with 28.6 g. sodium laurate and 1.3 g. $K_2S_2O_8$. After rinsing the mixture with nitrogen, 1,300 g. vinyl chloride are injected into the evacuated autoclave. The contents of the autoclave are then heated to 50° C. with stirring and are kept at this temperature during the entire polymerization time. In the course of 15 hours the pressure falls to 1 atmosphere and the autoclave is cooled. The resulting polyvinyl chloride dispersion has a pH value of 8.2 and a solids content of 25.2 percent.

EXAMPLE 3 b

In a 40 liter autoclave equipped with a stirrer and a heating jacket, 11,800 g. water are reacted with 258 g. sodium laurate, 11.7 g. $K_2S_2O_8$ and the polyvinyl chloride dispersion of example 3a. After rinsing the mixture with nitrogen, 11,700 g. vinyl chloride are injected into the evacuated autoclave. The contents of the autoclave are kept at 50° C. with stirring during the entire polymerization time. In the course of 11 hours the pressure falls to 1 atmosphere and the autoclave is cooled. The resulting polyvinyl chloride dispersion has a pH value of 9.0 and a solids content of 45.3 percent.

The polyvinyl chloride dispersion is divided into two portions. One of the portions is kept without any additions to it (3b.1). The other portion is mixed with an aqueous solution of 0.3 percent soda, based on the solids content (3b.2). Both of the polyvinyl chloride dispersions are dried by atomization. The K value of the isolated polyvinyl chloride is 71 (measured as a 0.5 percent solution in cyclohexanone at 25° C.).

EXAMPLE 4 a

In a 12 liter autoclave equipped with a stirrer and a heating jacket, 3,850 g. water are reacted with 13 g. lauric acid, 2.6 g. NaOH and 1.3 g. $K_2S_2O_8$. After rinsing the mixture with nitrogen, 1,300 g. vinyl chloride are injected into the evacuated autoclave. The contents of the autoclave are kept at 50° C. with stirring during the entire polymerization time. In the course of 19 hours the pressure falls to 1 atmosphere and the autoclave is cooled. The resulting polyvinyl chloride dispersion has a pH value of 8.2 and a solids content of 24.8 percent.

EXAMPLE 4 b

In a 40 liter autoclave equipped with a stirrer and a heating jacket, 11,800 g. water are reacted with 116 g. lauric acid, 23 g. NaOH, 11.7 g. $K_2S_2O_8$ and the polyvinyl chloride dispersion of example 4a. After rinsing the mixture with nitrogen, 11,700 g. vinyl chloride are injected into the evacuated autoclave. The contents of the autoclave are kept at 50° C. with stirring during the entire polymerization time. In the course of 14 hours the pressure falls to 1 atmosphere and the autoclave is cooled. The resulting polyvinyl chloride dispersion has a pH value of 8.6 and a solids content of 44.8 percent.

The polyvinyl chloride dispersion is divided into two portions. One of the portions is kept without any additions (4b.1). The other portion is mixed with an aqueous solution of 0.3 percent soda, based on the solids content (4b.2). Both of the polyvinyl chloride dispersions are dried by atomization. The K value of the isolated polyvinyl chloride is 74 (measured as a 0.5 percent solution in cyclohexanone at 25° C.).

EXAMPLE 5 a

In a 12 liter autoclave equipped with a stirrer and a heating jacket, 3,800 g. water are reacted with 1.3 g. $K_2S_2O_8$ and 108 g. of a suspension of the sodium salt of $\alpha$-sulfo-fatty acid with 12 to 18 carbon atoms (approximate chain distribution 52% $C_{12}$, 18% $C_{14}$, 10% $C_{16}$, 20% $C_{18}$) in water (24 percent active substance, pH value 5.0). After rinsing the mixture with nitrogen, 1,300 g. vinyl chloride are injected into the evacuated autoclave. The contents of the autoclave are heated to 53° C. with stirring during the entire polymerization time. In the course of 14 hours the pressure falls to 1 atmosphere and the autoclave is cooled. The resulting polyvinyl chloride dispersion has a pH value of 3.1 and a solids content of 25 percent.

EXAMPLE 5 b

In a 40 liter autoclave equipped with a stirrer and a heating jacket, 12,400 g. water are reacted with 975 g. of a suspension of the sodium salt of $\alpha$-sulfo-fatty acid with 12 to 18 carbon atoms in water (24 percent active substance, pH value 5.0), 11.7 g. $K_2S_2O_8$ and the polyvinyl chloride dispersion of example 5a. After rinsing with nitrogen, 11,700 g. vinyl chloride are injected into the evacuated autoclave. The contents of the autoclave are heated to 52° C. with stirring during the entire polymerization time. In the course of 11.5 hours the pressure falls to 1 atmosphere and the autoclave is cooled. The resulting polyvinyl chloride dispersion has a pH value of 4.3 and a solids content of 43.2 percent. The polyvinyl chloride dispersion is dried by atomization (5b). The K value of the isolated polyvinyl chloride is 70 (measured as a 0.5 percent solution in cyclohexanone at 25° C.).

EXAMPLE 6 a

In a 12 liter autoclave equipped with a stirrer and a heating jacket, 3,800 g. water are reacted with 1.3 g. $K_2S_2O_8$ and 113 g. of a suspension of the disodium salt of $\alpha$-sulfo-fatty acid with 16 to 18 carbon atoms (approximate chain distribution 48% $C_{16}$, 52% $C_{18}$) in water (23 percent active substance, pH value 8.0). After rinsing with nitrogen, 1,300 g. vinyl chloride are injected into the evacuated autoclave. The contents of the autoclave are kept at 50° C. with stirring during the entire polymerization time. In the course of 19.5 hours the pressure falls to 1 atmosphere and the autoclave is cooled. The resulting polyvinyl chloride dispersion has a pH value of 7.5 and a solids content of 25 percent.

EXAMPLE 6 b

In a 40 liter autoclave equipped with a stirrer and a heating jacket, 12,450 g. water are reacted with 1,040 g. of a suspension of the disodium salt of $\alpha$-sulfo-fatty acid with 16 to 18 carbon atoms in water (23 percent active substance, pH value 8.0), 11.7 g. $K_2S_2O_8$ and the polyvinyl chloride dispersion of example 6a. After rinsing the mixture with nitrogen, 11,700 g. vinyl chloride are injected into the evacuated autoclave. The contents of the autoclave are then kept at 50° C. with stirring during the entire polymerization time. In the course of 14 hours the pressure falls to 1 atmosphere and the autoclave is cooled. The resulting polyvinyl dispersion has a pH value of 7.6 and a solids content of 44 percent.

The polyvinyl chloride dispersion is divided into two portions. One of these portions is kept without additions (6b.1). The other portion is mixed with an aqueous solution of 0.3 percent soda, based upon the solids content (6b.2). Both of the polyvinyl chloride dispersions are dried by atomization. The K value of the isolated polyvinyl chloride is 72 (measured as a 0.5 percent solution in cyclohexanone at 25° C.).

EXAMPLES 7a and 7 b

A polyvinyl chloride dispersion is produced according to examples 6a and 6b. It then has a pH value of 7.8 and a solids content of 43.2 percent.

The polyvinyl chloride dispersion is divided into two portions. One of these portions is mixed with an aqueous solution of 0.2 percent $Li_2CO_3$, based on the solids content (7b.1). The other portion is mixed with a suspension of 0.3 percent $Li_2CO_3$ (7b.2). Both polyvinyl chloride dispersions are dried by atomization. The K value of the isolated polyvinyl chloride is 72.5 (measured as a 0.5 percent solution in cyclohexanone at 25° C.).

EXAMPLE 8 a

In a 12 liter autoclave equipped with a stirrer and a heating jacket, 3,800 g. water are reacted with 1.3 g. $K_2S_2O_8$ and 100 g. of a suspension of the disodium salt of $\alpha$-sulfo-lauric acid in water (26.5 percent active substance, pH value 9.2). After rinsing the mixture with nitrogen, 1,300 g. vinyl chloride are injected into the evacuated autoclave. The contents of the autoclave are heated to 50° C. with stirring during the entire polymerization time. In the course of 23 hours the pressure falls to 1 atmosphere and the autoclave is cooled. The resulting polyvinyl chloride dispersion has a pH value of 6.6 and a solids content of 24.7 percent.

EXAMPLE 8 b

In a 40 liter autoclave equipped with a stirrer and heating jacket, 12,450 g. water are reacted with 885 g. of a suspension of the disodium salt of $\alpha$-sulfo-lauric acid in water (26.5 percent active substance, pH value 9.2), 11.7 g. $K_2S_2O_8$ and the polyvinyl chloride dispersion of example 8a. After rinsing the mixture with nitrogen, 11,700 g. vinyl chloride are injected into the evacuated autoclave. The contents of the autoclave are heated to 50° C. with stirring during the entire polymerization time. In the course of 24 hours the pressure falls to 1 atmosphere and the autoclave is cooled. The resulting polyvinyl chloride has a pH value of 7.1 and a solids content of 43.2 percent.

The polyvinyl chloride dispersion is divided into three portions. The first portion is mixed with an aqueous solution of 0.1 percent soda, based on the solids (8b.1). The second portion is reacted with an aqueous solution of 0.3 percent soda (8b.28b.3).

All three polyvinyl chloride dispersions are dried by atomization. The K value of the isolated polyvinyl chloride is 73.5 (measured as a 0.5 percent solution in cyclohexanone at 25° C.).

EXAMPLE 9 a

In a 12 liter autoclave equipped with a stirrer and a heating jacket, 3,800 g. water are reacted with 1.3 g. $K_2S_2O_8$ and 108 g. of a suspension of the disodium salt of $\alpha$-sulfo-fatty acid with 12 to 18 carbon atoms (approximate chain distribution 52% $C_{12}$, 18% $C_{14}$, 10% $C_{16}$, 20% $C_{18}$) in water (24 percent of active substance, pH value 9.2). After rinsing with nitrogen, 1,300 g. vinyl chloride are injected into the evacuated autoclave. The contents of the autoclave are heated to 50° C. with stirring during the entire polymerization time. In the course of 18.5 hours the pressure falls to 1 atmosphere and the autoclave is cooled. The resulting polyvinyl chloride dispersion has a pH value of 7.3 and a solids content of 24.9 percent.

EXAMPLE 9 b

In a 40 liter autoclave equipped with a stirrer and a heating jacket, 12,450 g. water are reacted with 975 g. of a suspension of the disodium salt of $\alpha$-sulfo-fatty acid with 12 to 18 carbon atoms in water (24 percent active substance, pH value 9.2), 11.7 g. $K_2S_2O_8$ and the polyvinyl chloride dispersion of example 9a. After rinsing the mixture with nitrogen, 11,700 g. vinyl chloride are injected into the evacuated autoclave. The contents of the autoclave are heated to 50° C. with stirring during the entire polymerization time. In the course of 14.5 hours the pressure falls to 1 atmosphere and the autoclave is cooled. The resulting polyvinyl chloride dispersion has a pH value of 8.2 and a solids content of 42.7 percent.

The polyvinyl chloride dispersion is divided into four portions. To the first portion is then mixed an aqueous solution of 0.02 percent soda, based on the solids (9b.1), the second portion is mixed with 0.07 percent soda (9b.2), the third portion is mixed with 0.3 percent soda (9b.3), while the fourth portion does not have anything added to it (9b.4). All four portions are then dried by atomization. The K value of the isolated polyvinyl chloride is 72 (measured as a 0.5 percent solution in cyclohexanone at 25° C.).

EXAMPLE 10 a

In a 12 liter autoclave equipped with a stirrer and a heating jacket, 3,800 g. water are reacted with 1.3 g. $K_2S_2O_8$ and 108 g. of a suspension of the disodium salt of $\alpha$-sulfo-fatty acid with 12 to 18 carbon atoms in water (24 percent active substance, pH value 9.2). After rinsing with nitrogen, 1,300 g. vinyl chloride are injected into the evacuated autoclave. The contents of the autoclave are heated to 53° C. with stirring during the entire polymerization time. In the course of 12 hours the pressure falls to 1 atmosphere and the autoclave is cooled. The resulting polyvinyl chloride dispersion has a pH value of 7.4 and a solids content of 24.3 percent.

EXAMPLE 10 b

In a 40 liter autoclave equipped with a stirrer and a heating jacket, 12,450 g. water are reacted with 975 g. of a suspension of the disodium salt of $\alpha$-sulfo-fatty acid with 12 to 18 carbon atoms in water (24 percent active substance, pH value 9.2), 11.7 g. $K_2S_2O_8$ and the polyvinyl chloride dispersion of example 10a. After rinsing with nitrogen, 11,700 g. vinyl chloride are injected into the evacuated autoclave. The contents of the autoclave are heated to 52° C. with stirring during the entire polymerization time. In the course of 12 hours the pressure falls to 1 atmosphere and the autoclave is cooled. The resulting polyvinyl chloride dispersion has a pH value of 7.8 and a solids content of 43.9 percent.

The polyvinyl chloride dispersion is divided into two portions. One portion is mixed with an aqueous solution of 0.16 percent $Li_2CO_3$, based on the solids (10b.1). The other portion is mixed with an aqueous suspension of 0.4 percent $Li_2CO_3$ (10b.2). Both polyvinyl chloride dispersions are dried by atomization. The K value of the isolated polyvinyl chloride is 69.8 (measured as a 0.5 percent solution in cyclohexanone at 25° C.).

EXAMPLE 11 a

In a 12 liter autoclave equipped with a stirrer and a heating jacket, 3,800 g. water are reacted with 1.3 g. $K_2S_2O_8$ and 56.5 g. of a suspension of the disodium salt of $\alpha$-sulfo-fatty acid with 16 to 18 carbon atoms in water (23 percent active substance, pH value 8.0). After rinsing with nitrogen, 1,300 g. vinyl chloride are injected into the evacuated autoclave. The contents of the autoclave are kept at 50° C. with stirring during the entire polymerization time. In the course of 19.5 hours the pressure falls to 1 atmosphere and the autoclave is cooled. The resulting polyvinyl chloride dispersion has a pH value of 7.2 and solids content of 24.8 percent.

EXAMPLE 11 b

In a 40 liter autoclave equipped with a stirrer and a heating jacket, 12,450 g. water are reacted with 510 g. of a suspension of $\alpha$-sulfo-fatty acid with 16 to 18 carbon atoms in water (23 percent active substance, pH value 8.0), 11.7 g. $K_2S_2O_8$ and the polyvinyl chloride dispersion of example 11a. After rinsing with nitrogen, 11,700 g. vinyl chloride are injected into the evacuated autoclave. The contents of the autoclave are heated to 50° C. with stirring during the entire polymerization time. In the course of 18.5 hours the pressure falls to 1 atmosphere and the autoclave is cooled. The resulting polyvinyl chloride dispersion has a pH value of 7.7 and a solids content of 42.9 percent.

The polyvinyl chloride dispersion is divided into two portions. To one portion is added an aqueous solution of 0.25 percent soda, based on the solids (11b.1). The other portion remains without any addition (11b.2). Both portions are dried by atomization. The K value of the isolated polyvinyl chloride is 73 (measured as a 0.5 percent solution in cyclohexanone at 25° C.).

EXAMPLE 12 a

In a 12 liter autoclave equipped with a stirrer and a heating jacket, 3,800 g. water are reacted with 1.3 g. $K_2S_2O_8$ and 96 g. of a suspension of the disodium salt of α-sulfo-fatty acid with 12 to 18 carbon atoms (27 percent active substance, pH value 8.6). After rinsing with nitrogen, 1,300 g. vinyl chloride are injected into the evacuated autoclave. The contents of the autoclave are heated to 53° C. with stirring and are kept at this temperature during the entire polymerization time. In the course of 11 hours the pressure falls to 1 atmosphere and the autoclave is cooled. The resulting polyvinyl chloride dispersion has a pH value of 7.0 and a solids content of 25 percent.

EXAMPLE 12 b

In a 40 liter autoclave equipped with a stirrer and a heating jacket, 12,400 g. water are reacted with 866 g. of a suspension of the disodium salt of α-sulfo-fatty acid with 12 to 18 carbon atoms in water (27 percent active substance, pH value 8.6), 11.7 g. $K_2S_2O_8$ and the polyvinyl chloride dispersion of example 12a. After rinsing with nitrogen, 11,700 g. vinyl chloride are injected into the evacuated autoclave. The contents of the autoclave are heated to 52° C. with stirring and are kept at this temperature during the entire polymerization time. In the course of 15 hours the pressure falls to 1 atmosphere and the autoclave is cooled. The resulting polyvinyl chloride dispersion has a pH value of 7.5 and a solids content of 43.1 percent.

The polyvinyl chloride dispersion is divided into several portions which are thoroughly mixed respectively with an aqueous solution of 0.2 percent lithium carbonate (12b.1) based on the solids, of 0.03 percent LiOH (12b.2), and of 0.05 percent NaOH (12b.3). The dispersions are dried by atomization. The K value of the isolated polyvinyl chloride is 71.5 (measured as a 0.5 percent solution in cyclohexanone at 25° C.).

EXAMPLE 13

In a 40 liter autoclave equipped with a stirrer and a heating jacket, 15,200 g. water are reacted with 5.2 g. $K_2S_2O_8$ and 400 g. of a suspension of the disodium salt of α-sulfo-lauric acid in water (26.5 percent active substance, pH value 9.2). After rinsing with nitrogen, 5,200 g. vinyl chloride are injected into the evacuated autoclave. The contents of the autoclave are heated to 52° C. with stirring, the heating to this temperature being continued during the entire polymerization time. In the course of 18 hours the pressure falls to 1 atmosphere and the autoclave is cooled. The resulting polyvinyl chloride dispersion has a pH value of 7.0 and a solids content of 24.5 percent.

The polyvinyl chloride dispersion is divided into three portions, one of which is mixed with an aqueous solution of 0.3 percent soda (13.1) based on the solids, and another of which is mixed with a 0.2 percent solution of $Li_2CO_3$ (13.2). The third portion does not have anything added to it (13.3). The dispersions are dried by atomization. The K value of the isolated polyvinyl chloride is 71 (measured as a 0.5 percent solution in cyclohexanone at 25° C.).

HEAT TEST

One hundred parts by weight of the isolated polymer are mixed with 30 parts by weight of Vestinol AH (di-2-ethyl-hexyl-phthalate) and x parts by weight of stabilizers. The mixture is then rolled at 165° C. into a film. After the film has cooled, rectangular plates are punched therefrom. The plates are then heated in an oven to 190° C. for different periods of time, namely for 10, 20, 30 and 40 minutes. The gradually increasing decomposition is estimated by the degree of discoloration. As a tin-organic stabilizer, x=1 part by weight of Advastab 17M (dibutyl-tin-mercaptide of German Advance Production GmbH) is added; as a barium cadmium stabilizer, x=1 part by weight of Ferro 1827 (barium cadmium complex of Chemische Werke München, Otto Bärlocher GmbH) is added; and as a lead stabilizer, x=2 parts by weight of Tribase (tribasic lead sulfate of Metallgesellschaft) and 1 part by weight of DS 207 (dibasic lead stearate of the Metallgesellschaft) are added.

In the heat test the numbers have the following meanings:

1 colorless
2 yellow or reddish
3 brown or deep red
4 black

TABLE I

| Polymer | Tin-organic stabilization (minutes) | | | Ba/Cd stabilization (minutes) | | | Lead stabilization (minutes) | | |
|---|---|---|---|---|---|---|---|---|---|
| | 20 | 30 | 40 | 10 | 30 | 40 | 10 | 30 | 40 |
| Controls: | | | | | | | | | |
| 1b.1 | 2 | 2 | 4 | 2 | 4 | ---- | 1 | 2 | 3 |
| 1b.2 | 2 | 2 | 3-4 | 2 | 4 | ---- | ---- | ---- | ---- |
| 1b.3 | 2 | 2 | 3 | 2 | 4 | ---- | 1 | 2 | 3 |
| 1b.4 | 2 | 2 | 4 | 2 | 4 | ---- | 1 | 2 | 3 |
| 2b.1 | 1-2 | 2 | 3 | 2 | 4 | ---- | 1 | 3 | 3 |
| 2b.2 | 1 | 2 | 3 | 2 | 4 | ---- | 2 | 3 | 3 |
| 3b.1 | 2 | 2 | 3 | 2 | 2-3 | 4 | 1 | 2 | 2 |
| 3b.2 | 2 | 2 | 3 | 2 | 3 | 3 | 1 | 2 | 2 |
| 4b.1 | 2 | 2 | 4 | 2 | 4 | ---- | ---- | ---- | ---- |
| 4b.2 | 2 | 2 | 3 | 2 | 3 | 4 | 1 | 1 | 1 |
| 5b.1 | 2 | 2-3 | 4 | 3 | 3-4 | 4 | 1 | 2 | 3 |
| Examples: | | | | | | | | | |
| 6b.1 | 1 | 2 | 3 | 1 | 4 | ---- | 1 | 1 | 1 |
| 6b.2 | 1 | 1 | 1 | 1 | 1 | 2 | 1 | 1 | 1 |
| 7b.1 | 1 | 1 | 1 | 1 | 1 | 1 | 1 | 1 | 1 |
| 7b.2 | 1 | 1 | 1 | 1 | 1 | 1 | 1 | 1 | 1 |
| 8b.1 | 1 | 1 | 2 | 1 | 3 | 3 | ---- | ---- | ---- |
| 8b.2 | 1 | 1 | 1 | 1 | 1 | 2 | 1 | 1 | 1 |
| 8b.3 | 1 | 2 | 2 | 1 | 3 | 4 | 1 | 1 | 1 |
| 9b.1 | 1 | 2 | 3 | 1 | 3 | 3-4 | ---- | ---- | ---- |
| 9b.2 | 1 | 2 | 3 | 1 | 3 | 3 | ---- | ---- | ---- |
| 9b.3 | 1 | 1 | 1 | 1 | 1 | 2 | 1 | 1 | 1 |
| 9b.4 | 1 | 2 | 3 | 1 | 3 | 4 | 1 | 1 | 1 |
| 10b.1 | 1 | 1 | 1 | 1 | 1 | 2 | 1 | 1 | 1 |
| 10b.2 | 1 | 1 | 1 | 1 | 1 | 2 | 1 | 1 | 2 |
| 11b.1 | 1 | 1 | 2 | 1 | 1 | 2 | 1 | 1 | 1 |
| 11b.2 | 1 | 1 | 2 | 1 | 4 | ---- | 1 | 1 | 1 |
| 12b.1 | 1 | 1 | 1 | 1 | 1 | 1 | 1 | 1 | 1 |
| 12b.2 | 1 | 1 | 1 | 1 | 1 | 2 | 1 | 1 | 1-2 |
| 12b.3 | 1 | 1 | 1 | 1 | 1-2 | 2 | 1 | 1 | 1-2 |
| 13.1 | 1 | 1 | 1 | 1 | 1-2 | 2 | 1 | 1 | 1 |
| 13.2 | 1 | 1 | 1 | 1 | 1 | 2 | 1 | 1 | 1 |
| 13.3 | 1 | 2 | 2 | 1 | 4 | ---- | 1 | 1 | 1-2 |

EXAMPLE 14

In a 40 liter autoclave equipped with a stirrer and a heating jacket, 23,500 g. water are reacted with 90 g. sodium alkyl sulfonate (K30) and 6 g. $K_2S_2O_8$. After rinsing with nitrogen, 600 g. vinyl acetate and 5,400 g. vinyl chloride are injected into the evacuated autoclave. The contents of the autoclave are heated to 50° C. with stirring during the entire polymerization time. In the course of 12 hours the pressure falls to 1 atmosphere and the autoclave is cooled.

The resulting dispersion has a pH value of 3.7 and a solids content of 19.4 percent. The dispersion is divided into three portions which are mixed respectively with an aqueous suspension or solution of 0.3 percent soda (14.1) based on the solids, 0.3 percent $K_2CO_3$ (14.2) and 0.3 percent $Li_2CO_3$ (14.3). All three dispersions are dried by atomization. The K value of the isolated VC/VAc copolymer is 68.5 (measured as a 0.5 percent solution in cyclohexanone at 25° C.).

EXAMPLE 15

In a 40 liter autoclave equipped with a stirrer and a heating jacket, 23,500 g. water are reacted with 45 g. sodium alkyl sulfonate (K30), 40.8 g. lauric acid, 8.1 g. NaOH and 6 g. $K_2S_2O_8$. After rinsing with nitrogen, 600 g. vinyl acetate and 5,400 g. vinyl chloride are injected into the evacuated autoclave. The contents of the autoclave are heated to 50° C. with stirring during the entire polymerization time. In the course of 8 hours the pressure falls to 1 atmosphere and the autoclave is cooled.

The resulting dispersion has a pH value of 5.7 and a solids content of 19.2 percent. The dispersion is divided into three portions, two of which are mixed respectively with an aqueous suspension or solution of 0.3 percent $Li_2CO_3$ (15.1) based on the solids and of 0.3 percent soda (15.2). The third portion (15.3) remains without any addition. All three portions are dried by atomization. According to its analysis the copolymer contains 50.6 percent chlorine. The K value of the copolymer is 68 (measured as a 0.5 percent solution in cyclohexanone at 25° C.).

EXAMPLE 16

In a 40 liter autoclave equipped with a stirrer and a heating jacket, 23,500 g. water are reacted with 480 g. of a suspension of the disodium salt of α-sulfo-fatty acid with 16 to 18 carbon atoms in water (25 percent active substance, pH value 8.4), and 8 g. $K_2S_2O_8$. After rinsing with nitrogen, 800 g. vinyl acetate and 7,200 g. vinyl chloride are injected into the evacuated autoclave. The contents of the autoclave are heated to 50° C. with stirring during the entire polymerization time. In the course of 9 hours the pressure drops to 1 atmosphere and the autoclave is cooled. The resulting dispersion has a pH value of 6.4 and a solids content of 25 percent. The dispersion is divided into four portions, three of which are mixed respectively with an aqueous suspension or solution of 0.3 percent soda (16.1) based on the solids, 0.3 percent $Li_2CO_3$ (16.2) and 0.15 percent LiOH (16.3). The fourth portion (16.4) remains without any addition. All four dispersions are dried by atomization. According to analysis, the copolymer contains 51.2 percent chlorine. The K value of the copolymer is 69 (measured as a 0.5 percent solution in cyclohexanone at 25° C.).

EXAMPLE 17

In a 40 liter autoclave equipped with a stirrer and a heating jacket, 23,900 g. water are reacted with 60 g. sodium alkyl sulfonate (K30), 54 g. lauric acid, 10.8 g. NaOH and 8 g. $K_2S_2O_8$. After rinsing with nitrogen, 200 g. vinyl isobutyl ether and 7,800 g. vinyl chloride are injected into the evacuated autoclave. The contents of the autoclave are heated to 50° C. with stirring during the entire polymerization time. In the course of 19 hours the pressure falls to 2.4 atmospheres and the autoclave is cooled.

The resulting dispersion has a pH value of 5.2 and a solids content of 23.1 percent. The dispersion is divided into four portions, three of which are mixed respectively with an aqueous suspension or solution of 0.3 percent soda (17.1) based on the solids, 0.7 percent soda (17.2) and 0.25 percent $Li_2CO_3$ (17.3). The fourth portion (17.4) remains without any addition. All four dispersions are dried by atomization. According to analysis, the copolymer contains 54.6 percent chlorine. The K value of the copolymer is 59.5 (measured as a 0.5 percent solution in cyclohexanone at 25° C.).

EXAMPLE 18

In a 40 liter autoclave equipped with a stirrer and a heating jacket, 23,500 g. water are reacted with 480 g. of a suspension of the disodium salt of α-sulfo-fatty acid with 16 to 18 carbon atoms in water (25 percent active substance, pH value 8.4) and 8 g. $K_2S_2O_8$. After rinsing with nitrogen, 200 g. vinyl isobutyl ether and 7,800 g. vinyl chloride are injected into the evacuated autoclave. The contents of the autoclave are heated to 50° C. with stirring during the entire polymerization time. In the course of 18 hours the pressure falls to 2.5 atmospheres and the autoclave is cooled.

The resulting dispersion has a pH value of 6.2 and a solids content of 24.7 percent. The dispersion is divided into four portions. Three of these portions are mixed respectively with an aqueous suspension or solution of 0.3 percent soda (18.1) based on the solids, 0.5 percent soda (18.2) and 0.25 percent $Li_2CO_3$ (18.3). The fourth portion remains without any addition (18.4). All four dispersions are dried by atomization. According to analysis the copolymer contains 54.6 percent chlorine. The K value of the copolymer is 60 (measured as a 0.5 percent solution in cyclohexanone at 25° C.).

EXAMPLE 19

In a 40 liter autoclave equipped with a stirrer and a heating jacket, 23,500 g. water are reacted with 500 g. of an aqueous suspension of the disodium salt of α-sulfo-lauric acid (26 percent active substance, pH value 8.7) and 8 g. $K_2S_2O_8$. After rinsing with nitrogen, 800 g. vinyl acetate and 7,200 g. vinyl chloride are injected into the evacuated autoclave. The contents of the autoclave are heated to 50° C. with stirring during the entire polymerization time. In the course of 10 hours the pressure falls to 1 atmosphere and the autoclave is cooled.

The resulting dispersion has a pH value of 6.7 and a solids content of 24.5 percent. It is divided into three portions, which are mixed respectively with an aqueous suspension or solution of 0.3 percent soda (19.1) based on the solids, 0.3 percent $Li_2CO_3$ (19.2) and 0.55 percent $Li_2CO_3$ (19.3). All three dispersions are dried by atomization. According to analysis the copolymer contains 50.8 percent chlorine. The K value is 69 (measured as a 0.5 percent solution in cyclohexanone at 25° C.).

EXAMPLE 20

In a 40 liter autoclave equipped with a stirrer and a heating jacket, 23,500 g. water are reacted with 120 g. sodium laurate and 6 g. $K_2S_2O_8$. After rinsing with nitrogen, 600 g. vinyl acetate and 5,400 g. vinyl chloride are injected into the evacuated autoclave. The contents of the autoclave are heated to 50° C. with stirring during the entire polymerization time. In the course of 13 hours the pressure falls to 1 atmosphere and the autoclave is cooled.

The resulting dispersion has a pH value of 7.8 and a solids content of 19.6 percent. The dispersion is separated into two portions, one of which is mixed with 0.3 percent soda (20.1) while the other portion (20.2) remains without any addition. Both dispersions are dried by atomization. According to analysis the copolymer contains 51.6 percent chlorine.

EXAMPLE 21

In a 40 liter autoclave equipped with a stirrer and a heating jacket, 14,600 g. water are reacted with 75 g. sodium alkyl sulfonate (K30) and 5 g. $K_2S_2O_8$. After rinsing with nitrogen, 500 g. vinylidene chloride and 4,500 g. vinyl chloride are injected into the autoclave. The contents of the autoclave are heated to 50° C. with stirring during the entire polymerization time. In the course of 19 hours the pressure falls to 1.6 atmospheres and the autoclave is cooled.

The resulting dispersion has a pH value of 2.7 and a solids content of 24.5 percent. The dispersion is divided into three portions, two of which are mixed with an aqueous suspension or solution of 0.3 percent soda (21.1) based on the solids and 0.3 percent $Li_2CO_3$ (21.2), while the third portion (21.3) remains without any addition. All three dispersions are dried by atomization.

EXAMPLE 22

In a 40 liter autoclave equipped with a stirrer and a heating jacket, 23,500 g. water are reacted with 90 g. sodium alkyl sulfonate (K30), 60 g. sodium laurate and 6 g. $K_2S_2O_8$. After rinsing with nitrogen, 600 g. vinylidene chloride and 5,400 g. vinyl chloride are injected into the autoclave. The contents of the autoclave are heated to 50° C. with stirring during the entire polymerization time. In the course of 25 hours the pressure falls to 1.4 atmospheres and the autoclave is cooled.

The resulting dispersion has a pH value of 6.8 and a solids content of 20.2 percent. The dispersion is divided into three portions, two of which are mixed respectively with an aqueous suspension or solution of 0.3 percent soda (22.1) based on the solids, and 0.3 percent $Li_2CO_3$ (22.2) while the third portion (22.3) remains without any addition. All three dispersions are dried by atomization.

EXAMPLE 23

In a 40 liter autoclave equipped with a stirrer and a heating jacket, 23,500 g. water are reacted with 480 g. of a suspension of the disodium salt of α-sulfo-fatty acid with 16 to 18 carbon atoms in water (25 percent active substance, pH value 8.4), and 8 g. $K_2S_2O_8$. After rinsing with nitrogen, 800 g. vinylidene chloride and 7,200 g. vinyl chloride are injected into the autoclave. The contents of the autoclave are heated to 50° C. with stirring during the entire polymerization time. In the course of 27 hours, the pressure falls to 1.9 atmospheres and the autoclave is cooled.

The resulting dispersion has a pH value of 6.4 and a solids content of 24.8 percent. The dispersion is divided into four portions, three of which are mixed respectively with an aqueous dispersion or solution of 0.3 percent soda (23.1) based on the solids, 0.3 percent $Li_2CO_3$ (23.2) and 0.15 percent lithium hydroxide (23.2); the fourth portion remaining without any addition (23.4). All four portions are dried by atomization.

EXAMPLE 24

In a 40 liter autoclave equipped with a stirrer and a heating jacket, 14,600 g. water are reacted with 100 g. sodium laurate and 5 g. $K_2S_2O_8$. After rinsing with nitrogen, 500 g. vinylidene chloride and 4,500 g. vinyl chloride are injected into an autoclave. The contents of the autoclave are heated to 50° C. with stirring during the entire polymerization time. In the course of 23 hours the pressure falls to 1.4 atmospheres and the autoclave is cooled.

The resulting dispersion has a pH value of 8.3 and a solids content of 24.7 percent. The dispersion is divided into three portions, two of which are mixed respectively with an aqueous suspension or solution of 0.3 percent soda (24.1) based on the solids and 0.3 percent $Li_2CO_3$ (24.2), the third portion remaining without any addition (24.3). All three dispersions are dried by atomization.

EXAMPLE 25

In a 40 liter autoclave equipped with a stirrer and a heating jacket, 14,600 g. water are reacted with 385 g. of an aqueous suspension of the disodium salt of $\alpha$-sulfo-lauric acid (26 percent, pH value 8.7) and 5 g. $K_2S_2O_8$. After rinsing with nitrogen, 500 g. vinylidene chloride and 4,500 g. vinyl chloride are injected into the autoclave. The contents of the autoclave are heated to 50° C. with stirring during the entire polymerization time. In the course of 24 hours the pressure falls to 1.6 atmospheres and the autoclave is cooled.

The resulting dispersion has a pH value of 6.6 and a solids content of 24.8 percent. The dispersion is divided into three portions, two of which are mixed respectively with an aqueous suspension or solution of 0.3 percent soda (25.1) based on the solids and 0.3 percent $Li_2CO_3$ (25.2), the third portion remaining without any addition (25.3). All three portions are dried by atomization.

EXAMPLE 26

In a 40 liter autoclave equipped with a stirrer and a heating jacket, 11,800 g. water are reacted with 296 g. of an aqueous suspension of the disodium salt of $\alpha$-sulfo-fatty acid with 12 to 18 carbon atoms (27 percent, pH value 9.0) and 12 g. $K_2S_2O_8$. After rinsing with nitrogen, 3,600 g. vinyl chloride and 400 g. propylene are injected into the evacuated autoclave. The contents of the autoclave are heated to 60° C. with stirring during the entire polymerization time. In the course of 24 hours the pressure falls to 5.6 atmospheres and the autoclave is cooled. The resulting dispersion has a pH value of 6.2 and a solids content of 23.5 percent. It is mixed with 0.3 percent soda (26) based on the solids, and is then dried by atomization. According to analysis the copolymer contains 52.8 percent chlorine. The K value of the copolymer is 51.5 (measured as a 0.5 percent solution in cyclohexanone at 25° C.).

EXAMPLE 27

In a 40 liter autoclave equipped with a stirrer and a heating jacket, 11,900 g. water are reacted with 40 g. sodium alkyl sulfonate (K30), 40 g. sodium laurate and 12 g. $K_2S_2O_8$. After rinsing with nitrogen, 3,600 g. vinyl chloride and 400 g. propylene are injected into the autoclave. The contents of the autoclave are heated to 60° C. with stirring during the entire polymerization time. In the course of 23 hours the pressure falls to 5 atmospheres and the autoclave is cooled. The resulting dispersion has a pH value of 6.2 and a solids content of 22.9 percent. It is mixed with a solution of 0.3 percent soda (27) based on the solids content, and is then dried by atomization. According to analysis the copolymer contains 52.8 percent chlorine. The K value of the copolymer is 50.5 (measured as a 0.5 percent solution in cyclohexanone at 25° C.).

EXAMPLE 28

In a 40 liter autoclave equipped with a stirrer and a heating jacket, 11,900 g. water are reacted with 80 g. sodium alkyl sulfonate (K30) and 12 g. $K_2S_2O_8$. After rinsing with nitrogen, 3,600 g. vinyl chloride and 180 g. ethylene are injected successively into the autoclave. The contents of the autoclave are heated to 60° C. with stirring during the entire polymerization time. 4 hours after arrival at the polymerization temperature, 100 g. ethylene were additionally injected into the autoclave. In the course of 24 hours the pressure falls to 7.1 atmospheres and the autoclave is cooled.

The resulting dispersion has a pH value of 2.3 and a solids content of 24.3 percent. It is mixed with 0.5 percent $Li_2CO_3$ (28) based on the solids, and is then dried by atomization. According to analysis the copolymer contains 54 percent chlorine. The K value of the copolymer is 59.5 (measured as a 0.5 percent solution in cyclohexanone at 25° C.).

EXAMPLE 29

In a 40 liter autoclave equipped with a stirrer and a heating jacket, 11,700 g. water are reacted with 296 g. of an aqueous suspension of the disodium salt of $\alpha$-sulfo-fatty acid with 16 to 18 carbon atoms (27 percent active substance, pH value 9.0) and 12 g. $K_2S_2O_8$. After rinsing with nitrogen, 3,600 g. vinyl chloride and 210 g. ethylene are injected successively into the autoclave. The contents of the autoclave are heated to 60° C. with stirring during the entire polymerization time. Four hours after arriving at the polymerization temperature, a further 100 g. ethylene are injected into the autoclave. In the course of 22 hours the pressure falls to 6.8 atmospheres and the autoclave is cooled.

The resulting dispersion has a pH value of 6.0 and a solids content of 24.1 percent. It is mixed with 0.5 percent $Li_2CO_3$ (29) based on the solids, and is then dried by atomization. According to analysis the copolymer contains 53.3 percent chlorine. The K value of the copolymer is 60.5 (measured as a 0.5 percent solution in cyclohexanone at 25° C.).

EXAMPLE 30

In a 12 liter autoclave equipped with a stirrer and a heating jacket, 6,000 g. water are reacted with 20 g. sodium palmitate, 20 g. sodium alkyl sulfonate (K30) and 3 g. $K_2S_2O_8$. After rinsing with nitrogen, 200 ml. of a mixture of 1,800 g. vinyl chloride and 200 g. methyl-acrylate are injected into the evacuated autoclave. The contents of the autoclave are heated to 50° C. with stirring during the entire polymerization time. After a treatment period of 1.5, 2.0, 2.5, 3.0, 3.5, 4.0, 4.5, 5.0, 5.5, 6.0, 6.5 and 7.0 hours, 150 ml. of a mixture of 1,800 g. vinyl chloride and 200 g. methyl-acrylate is injected into the autoclave. In the course of 9 hours the pressure falls to 2 atmospheres and the autoclave is cooled. The resulting dispersion has a pH value of 7.2 and a solids content of 22.2 percent. The copolymer dispersion is divided into three portions. The first portion (30.1) remains without any addition. The second portion is mixed with an aqueous solution of 0.3 percent soda (30.2), based on the solids content. The third portion is mixed with an aqueous suspension of 0.3 percent $Li_2CO_3$ (30.3), based on the solids content. All three copolymer dispersions are dried by atomization. The K value of the isolated copolymer is 67.3 (measured as a 0.5 percent solution in cyclohexanone at 25° C.).

EXAMPLE 31

In a 12 liter autoclave equipped with a stirrer and a heating jacket, 5,900 g. water are reacted with 154 g. of an aqueous suspension of the disodium salt of $\alpha$-sulfo-fatty acid and with 16 to 18 carbon atoms (26 percent active substance, pH value 8.9) and 3 g. $K_2S_2O_8$. After rinsing with nitrogen, 200 ml. of a mixture of 1,800 g. vinyl chloride and 200 g. methyl-acrylate are injected into the evacuated autoclave. The contents of the autoclave are heated to 50° C. with stirring during the entire polymerization time. After a treatment period of 1.5, 2.0, 2.5, 3.0, 3.5, 4.0, 4.5, 5.0, 5.5, 6.0, 6.5 and 7.0 hours, 150 ml. of a mixture of 1,800 g. vinyl chloride and 200 g. methyl-acrylate is injected into the autoclave. In the course of 13 hours the pressure falls to 2.6 atmospheres and the autoclave is cooled.

The resulting dispersion has a pH value of 7.3 and a solids content of 22.3 percent. The copolymer dispersion is divided into three portions. The first portion (31.1) remains without any addition. The second portion is mixed with an aqueous solution of 0.3 percent soda (31.2), based on the solids content. The third portion is mixed with an aqueous suspension of 0.3 percent $Li_2CO_3$ (31.3), based on the solids content. All three copolymer dispersions are dried by atomization. The K value of the isolated copolymer is 68.6 (measured as a 0.5 percent solution in cyclohexanone at 25° C.).

HEAT TEST

In each case 100 parts by weight of the isolated polymer, 30 parts by weight of Vestinol AH (di-2-ethyl-hexyl-phthalate) and $x$ parts by weight of the stabilizer are mixed and rolled at 140° C. into a film which is then cooled and from which rectangular plates are punched. These plates are heated to 190° C. in an oven 10, 20 and 30 minutes and the increased decomposition, after increased heating periods, is estimated by the successive color changes.

As a tin organic stabilizer, $x=1$ part by weight of Advastab 17M (dibutyl-tin-mercaptide of the German Advance Production GmbH) and as a barium cadmium stabilizer, $x=1$ part by weight of Ferro 1827 (barium cadmium complex of the Chemische Werke München, Otto Bärlocher GmbH) is added.

In the preliminary preparation of the polyvinyl chloride samples in examples 26 and 27, 10 parts by weight of Vestinol AH (dioctyl-phthalate) were used instead of the usual 30 parts thereof.

The numbers designate the various colors as follows:
1 = colorless
2 = yellow or pink
3 = brown or deep red
4 = black

TABLE II

| Polymers | Tin organic stabilization (minutes) | | | Ba/Cd-stabilization (minutes) | | |
|---|---|---|---|---|---|---|
| | 10 | 20 | 30 | 10 | 20 | 30 |
| Controls: | | | | | | |
| 14.1 | 1 | 3 | 4 | 2 | 4 | |
| 14.2 | 1 | 3 | 4 | 2 | 4 | |
| 14.3 | 1 | 2 | 3-4 | 1-2 | 4 | |
| 15.1 | 1-2 | 2 | 3 | 1 | 4 | |
| 15.2 | 1-2 | 2-3 | 4 | 2 | 3 | 4 |
| 15.3 | 1-2 | 4 | | 2 | 4 | |
| 16.4 | 1 | 1 | 2-3 | 1-2 | 3-4 | 4 |
| 17.1 | 1-2 | 2 | 2 | 1-2 | 4 | |
| 17.2 | 2 | 2-3 | 3 | 2 | 2-3 | 4 |
| 17.3 | 1 | 2 | 2 | 1 | 2-3 | 4 |
| 17.4 | 1-2 | 4 | | 4 | | |
| 18.4 | 1-2 | 2 | 3-4 | 3 | 4 | |
| 20.1 | 2 | 2 | 2-3 | 2 | 2-3 | 4 |
| 20.2 | 2 | 2 | 2 | 2 | 3 | 4 |
| 21.1 | 1 | 2 | 3-4 | 2 | 4 | |
| 21.2 | 1 | 2 | 2-3 | 2 | 4 | |
| 21.3 | 1 | 4 | | 3 | 4 | |
| 22.1 | 1-2 | 2 | 3 | 2 | 3-4 | 4 |
| 22.2 | 1 | 2 | 2-3 | 2 | 3 | 4 |
| 22.3 | 2 | 3 | 4 | 2 | 4 | |
| 23.4 | 1 | 1-2 | 2 | 1-2 | 3 | 4 |
| 24.1 | 2 | 2 | 3 | 2 | 3 | 4 |
| 24.2 | 2 | 2 | 2 | 2 | 2-3 | 4 |
| 24.3 | 2 | 2 | 4 | 2 | 3-4 | 4 |
| 25.3 | 1 | 1-2 | 2 | 1-2 | 3 | 4 |
| 27 | 1-2 | 4 | | 2 | 4 | |
| 28 | 2 | 4 | | 4 | | |
| 30.1 | 1-2 | 3-4 | 4 | 3 | 4 | |
| 30.2 | 2 | 3 | 4 | 2 | 4 | |
| 30.3 | 1 | 2 | 3-4 | 1-2 | 4 | |
| 31.1 | 1-2 | 3 | 3-4 | 2-3 | 3 | 4 |
| Examples: | | | | | | |
| 16.1 | 1 | 1-2 | 2 | 1 | 1-2 | 3-4 |
| 16.2 | 1 | 1 | 1-2 | 1 | 1 | 3 |
| 16.3 | 1 | 1 | 2 | 1 | 1-2 | 3 |
| 18.1 | 1 | 1 | 1-2 | 1 | 1 | 3 |
| 18.2 | 1 | 1 | 1-2 | 1 | 1-2 | 2 |
| 18.3 | 1 | 1 | 1 | 1 | 1 | 1-2 |
| 19.1 | 1 | 1 | 2 | 1 | 2 | 3 |
| 19.2 | 1 | 1 | 1-2 | 1 | 1 | 3 |
| 19.3 | 1 | 1 | 1-2 | 1 | 1 | 2 |
| 23.1 | 1 | 1 | 2 | 1 | 1 | 4 |
| 23.2 | 1 | 1 | 1 | 1 | 1 | 3 |
| 23.3 | 1 | 1 | 1-2 | 1 | 1 | 3-4 |
| 25.1 | 1 | 1-2 | 1-2 | 1 | 1 | 3-4 |
| 25.2 | 1 | 1 | 1 | 1 | 1 | 3 |
| 26 | 1 | 2 | 2-3 | 1-2 | 3 | 4 |
| 29 | 1-2 | 2 | 4 | 2 | 3 | 4 |
| 31.2 | 1 | 2 | 2 | 1-2 | 2-3 | 3-4 |
| 31.3 | 1 | 1-2 | 2 | 1 | 2 | 3-4 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. Solid polymers and copolymers of vinyl chloride having improved heat-stabilizability with barium-cadmium stabilizers, prepared by emulsifying a material selected from the group consisting of vinyl chloride monomer and a mixture of vinyl chloride monomer and unsaturated polymerizable compounds with sodium salts of $\alpha$-sulfo-fatty acids having 12 to 24 carbon atoms and a concentration of 0.6 to 4.0 percent by weight based on said material to produce a dispersion, performing the polymerization at a pH of 6 to 11 to produce polymers and copolymers, mixing said dispersion with 0.02 to 2.0 percent by weight of alkaline agent based on said polymers and copolymers, said alkaline agent selected from the group consisting of alkali carbonates and alkali hydroxides, and drying said dispersion by atomization to produce said solid polymers and copolymers.

2. The product of claim 1, wherein said $\alpha$-sulfo-fatty acids are selected from the group consisting of $\alpha$-sulfolauric acid, $\alpha$-sulfomyristic acid, $\alpha$-sulfopalmitic acid, $\alpha$-sulfostearic acid, $\alpha$-sulfo-$\alpha$-methylpalmitic acid, $\alpha$-sulfo-$\alpha$-methylstearic acid, $\alpha$-sulfobehenic acid, $\alpha$-sulfoarachidic acid, $\alpha$-sulfolignoceric acid and mixtures thereof.

3. The product of claim 1, wherein said sodium salts of $\alpha$-sulfo-fatty acids have 12 to 18 carbon atoms, said concentration is 0.8 to 3.0 percent by weight and said pH is 7.0 to 10.0.

4. The product of claim 1, wherein said alkaline agent is lithium carbonate.

5. The product of claim 1, wherein said alkaline agent is lithium hydroxide.

6. The product of claim 1, wherein said alkaline agent is 0.1 to 0.8 percent by weight.

7. The product of claim 6, wherein said alkaline agent is lithium carbonate.

8. The product of claim 6, wherein said alkaline agent is lithium hydroxide.

* * * * *

PO-1050
(5/69)

UNITED STATES PATENT OFFICE
CERTIFICATE OF CORRECTION

Patent No. 3,627,717      Dated December 14, 1971

Inventor(s) LUDWIG KUHNEN

It is certified that error appears in the above-identified patent and that said Letters Patent are hereby corrected as shown below:

Column 16, lines 30 and 46, "sodium" should read - -disodium- -

Signed and sealed this 28th day of November 1972.

(SEAL)
Attest:

EDWARD M. FLETCHER, JR.        ROBERT GOTTSCHALK
Attesting Officer                Commissioner of Patents